Patented Oct. 3, 1933

UNITED STATES PATENT OFFICE 1,929,399

MEDIUM FOR SEPARATING OIL-WATER EMULSIONS (BLOWN OIL)

Fritz Emil Fuchs, Maplewood, N. J., assignor, by mesne assignments to The Dehydro Company, Tulsa, Okla., a corporation of Oklahoma No Drawing. Application April 22, 1931
Serial No. 532,118

1 Claim. (Cl. 252—1)

For a long time past investigators, chemists and physicists have been attempting to discover, produce and improve chemicals or combinations of chemical substances which would efficiently separate oil in water or water in oil emulsions, known as cut oils, roily oils, etc., or the discharge from oil wells.

I am aware that certain wells and particularly so-called free flowing wells discharge water and oil, but in such a condition that the water and oil readily separate by gravity, they being not emulsified, but where it is necessary to employ pressure or where the oil is discharged under pressure or where it is necessary to pump the oil, emulsions are formed which must later be broken and separated.

Because of the nature of the emulsions, the relation of the oil and water, the physical condition of the emulsion, the content of water, the chemical nature of the water and the dispersion of the water in the oil, it has never been found possible to discover a single emulsion breaker that will operate with equal satisfaction at all wells, in fact it has been found that an emulsion breaker that will prove entirely satisfactory at one well may be totally unsatisfactory at another well quite local to the first well and for any of the reasons as above set forth or others too numerous to mention.

The present invention relates to a compound and the manufacture thereof that by experiments has been discovered to be very satisfactory in very many instances. It is known that an emulsion breaker must be miscible in both oil and water and that it must have other qualities such as a low cold test, penetration and the ability to rapidly break the surface tension that exists between the oil and water in an oil water globule.

In my study and experimentation I have satisfied myself that most rapid results can be obtained if I break the tension in the oil-water globules and allow the individual water globules to combine to form a larger body of water and the oil globules to combine to form a larger body of oil.

In the invention it becomes necessary to understand more fully the real action that takes place as in the material selected I realize that I am departing to an extent at least from well known and accepted materials. In this invention the basic material which I employ is so-called blown oil, that is an artificially oxidized oil. By artificially I mean oxidized by forcibly passing air through the oil in contra-distinction to oils that are oxidized by being exposed to the air for a long period of time.

In blowing oil oxidization takes place somewhat rapidly and also to some extent polymerization, depending of course upon the temperature, the time and the volume of air blown through the oil. The results of blowing oil are to increase the viscosity as well as the specific gravity thereof and also the formation of so-called oxy-acids. I have found that the saponification value is also increased and whereas the saponification of ordinary fatty oil is probably 190 milligrams KOH, this figure is raised, depending upon the extent of oxidization and the blown fish oil that I have used reaches a saponification number of approximately 270. Soaps formed of this oil differ radically from other soaps, not only in their behavior but also in appearance, being of a more liquid nature with increased solubility.

In making the soap, as soon as the caustic is allowed to come in contact with the oil immediate reaction takes place and it is only necessary to agitate the mixture for its completion. Ordinary oils used in soap making not only require considerable skill but intensive heating must be applied for a long time before saponification is completed, as the fatty acid glycerides must be broken up into free fatty acid and glycerine.

In making a blown oil soap, I have not found it necessary to add additional heat, the reaction between the caustic and the blown oil creating a sufficiently high temperature and I have also found that complete saponification takes place in a very short time.

I add a solvent such as diethylene glycol to keep the soap in solution. This solvent acts as a medium for solubility of the saponified portion in the unsaponified portion and further tends to increase the solubility of the compounds in water.

In my operation the material is formed as indicated and thereafter water may be added and the compound with the water introduced into the oil emulsion. I have found my compound readily soluble, miscible in water and sufficiently miscible in oil to break the oil-water globules and to allow the water to join the water in my compound in such oil free condition as to cause the water to readily separate from the oil.

Having carefully and fully described my invention, what I claim and desire to secure by Letters Patent is:

A material for separating water in oil emulsions which consists of a blown oil soap formed with a caustic and to which has been added diethylene glycol.

FRITZ EMIL FUCHS.